United States Patent [19]

Amano

[11] Patent Number: 5,180,631

[45] Date of Patent: Jan. 19, 1993

[54] SHEET MATERIAL AND PROCESS FOR PRODUCING THE SAME

[75] Inventor: Satoshi Amano, Tokyo, Japan

[73] Assignee: Nisshinbo Industries, Inc., Tokyo, Japan

[21] Appl. No.: 681,597

[22] Filed: Apr. 8, 1991

[30] Foreign Application Priority Data

Oct. 4, 1990 [JP] Japan .................................. 2-95959

[51] Int. Cl.$^5$ .......................... B32B 5/24; B32B 5/26; B32B 27/02; B32B 27/08; B65D 53/00
[52] U.S. Cl. .................... 428/236; 277/227; 277/228; 428/240; 428/241; 428/245; 428/283; 428/290; 428/412; 428/473.5; 428/480; 428/483
[58] Field of Search ............... 428/240, 241, 281, 290, 428/245, 236, 283, 412, 473.5, 480, 183; 277/227, 228

[56] References Cited

U.S. PATENT DOCUMENTS

| | | | |
|---|---|---|---|
| 3,965,051 | 6/1976 | Markusch et al. | 260/37 N |
| 4,060,664 | 11/1977 | McGuire et al. | 428/336 |
| 4,081,422 | 3/1978 | Cordes et al. | 260/40 R |
| 4,111,887 | 9/1978 | Shaner et al. | 260/37 AL |
| 4,144,372 | 3/1979 | Beck | 428/283 |
| 4,254,177 | 3/1981 | Fulmer | 428/256 |
| 4,273,879 | 6/1981 | Langer et al. | 521/91 |
| 5,049,603 | 9/1991 | Mochizuki | 524/97 |

*Primary Examiner*—James C. Cannon
*Attorney, Agent, or Firm*—Armstrong & Kubovcik

[57] ABSTRACT

The present invention provides a sheet material comprising a sheet-shaped material made of an inorganic filler other than asbestos, a rubber material and a polycarbodiimide pulp, and a reinforcing material treated with a polycarbodiimide resin.

The present invention further provides a process for producing a sheet material, which comprises shaping an inorganic filler other than asbestos, a rubber material and a polycarbodiimide pulp into sheet-shaped material, treating reinforcing material with a polycarbodiimide resin, laminating the sheet-shaped material and the reinforcing material, then hot-pressing them at a temperature equal to or higher than the softening point of the polycarbodiimide pulp and the polycarbodiimide resin.

9 Claims, No Drawings

SHEET MATERIAL AND PROCESS FOR PRODUCING THE SAME

BACKGROUND OF THE INVENTION (1) Field of the Invention

The present invention relates to a sheet material and a process for producing said sheet material. More particularly, the present invention relates to a sheet material excellent in flexibility, sealing property, heat resistance and strength, as well as to a process for producing said sheet material.

(2) Description of the Prior Art

An asbestos joint sheet is known as a sheet material used in gaskets, etc. This asbestos joint sheet as a conventional sheet material is generally made of asbestos (a fibrous basic material), a rubber material (a binder) and a filler in order to have flexibility, sealing property, heat resistance and strength. With respect to asbestos, however, there have arisen in recent years problems such as decrease of asbestos resource, resultant difficulty in asbestos procurement, and adverse effect on human health; accordingly, the use of asbestos is under restudy.

Because of the above-mentioned problems of asbestos, active researches are under way also in the sheet material field in order to enable production of an asbestos joint sheet substitute by the use of a fibrous basic material other than asbestos. As asbestos substitutes, there have been proposed inorganic fibers such as glass fiber, rock wool, ceramic fiber, carbon fiber and the like, as well as organic fibers such as aramid fiber, polyester fiber, polyacrylonitrile fiber, phenolic resin fiber and the like.

However, none of these inorganic and organic fibers has hitherto shown fully satisfactory sealing property because their diameters are large as compared with those of asbestos and disadvantageous to produce a dense structure.

In order to overcome the drawback, it was proposed to obtain improved sealing property by utilizing the melt-bonding of a thermoplastic polyolefin fiber or the like. However, such a fiber generally causes remelting at a temperature of 180° C. or less and accordingly has insufficient heat resistance.

Further with respect to strength, substantially none of the other sheet materials is superior to the asbestos joint sheet; therefore, it was proposed to use wire netting or a metal plate as a reinforcing material for imparting improved strength. The resulting sheet material has excellent strength, but has poor flexibility and moreover causes peeling at the interface with the adherent.

Thus, there has been developed no sheet material which uses no asbestos and yet fully satisfies all of flexibility, strength, sealing property, heat resistance, etc.

The present invention has been made in order to solve the above-mentioned problems of the prior art and provide a sheet material excellent in flexibility, strength, sealing property and heat resistance and a process for producing such a sheet material.

SUMMARY OF THE INVENTION

According to the present invention, there is provided a sheet material comprising a sheet-shaped material made of an inorganic filler other than asbestos, a rubber material and a polycarbodiimide pulp, and a reinforcing material treated with a polycarbodiimide resin.

The present invention further provides a process for producing a sheet material, which comprises shaping an inorganic filler other than asbestos, a rubber material and a polycarbodiimide pulp into sheet-shaped material, treating reinforcing material with a polycarbodiimide resin, laminating the sheet-shaped material and the reinforcing material, then hot-pressing them at a temperature equal to or higher than the softening points of the polycarbodiimide pulp and the polycarbodiimide resin.

DETAILED DESCRIPTION OF THE INVENTION

The present invention is hereinafter described in detail.

As mentioned above, the sheet material of the present invention comprises a sheet-shaped material made of an inorganic filler other than asbestos, a rubber material and a polycarbodiimide pulp, and a reinforcing material treated with a polycarbodiimide resin. As the inorganic filler other than asbestos, there can be mentioned the inorganic filler generally used in the field of gasket or sealing material. For example, fibers such as glass fiber, ceramic fiber, rock wool, carbon fiber, gypsum fiber and the like; powders, flakes or whiskers of clay, talc, barium sulfate, mica, vermiculite calcium carbonate, silica, wollastonite, magnesium sulfate, potassium titanate, carbon black and the like; and their appropriate mixtures can be used.

As the rubber material, there can be used rubbers conventionally known in production of joint sheets, such as nitrile rubber (NBR), styrene-butadiene rubber (SBR), isoprene rubber (IR), chloroprene rubber (CR), butadiene rubber (BR), butyl rubber (IIR), ethylene-propylene rubber (EPM), ethylene-vinyl acetate rubber (EVA), chlorinated polyethylene rubber (CPE), epichlorohydrin rubber (ECO), nitrileisoprene rubber (NIR), fluororubber (FPM), silicone rubber (Si), natural rubber (NR) and their latexes.

Incidentally, a vulcanizing agent (crosslinking agent), a vulcanizing accelerator, an antioxidant, a plasticizer and the like can be used with the rubber material, to satisfy the needs.

The polycarbodiimide pulp is obtained by preparing a hydrophilic polycarbodiimide polymer and then pulping the polymer according to a predetermined method. It can be produced specifically by transferring a hydrophilic polycarbodiimide polymer into a poor solvent to the polymer, for example, water, while applying a shear force. The polycarbodiimide pulp is characterized by its thermosetting property, uniform dispersibility in water and heat resistance.

The hydrophilic polycarbodiimide polymer can be prepared as follows. First, an organic diisocyanate is reacted with an alkyliminodiol to introduce a tertiary amine into the organic diisocyanate. In this reaction, the organic diisocyanate as a starting material compound includes, for example, a diisocyanate represented by the general formula

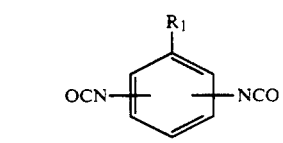

)R1 is a lower alkyl group or a lower alkoxy group) and a diisocyanate represented by the general formula

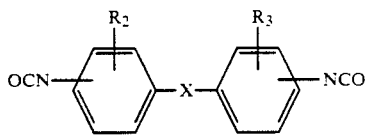

(R2 and R3 are each a lower alkyl group or an alkoxy group, and X is an oxygen atom or a methylene group).

Then, the organic diisocyanate having a tertiary amine is treated with a quaternizing agent to convert the tertiary amine into a quaternary amine, after which polycarbodiimidization is effected in the presence of a carbodiimidization catalyst, whereby a hydrophilic polycarbodiimide polymer can be obtained.

The proportions of the individual components mentioned above can be appropriately determined so as to meet the use purpose or use conditions of sheet material, but are as follows, for example.

| Inorganic filler | 30–90% by weight |
| Rubber material | 5–50% by weight |
| Polycarbodiimide pulp | 1–50% by weight |

The above components can be made into a sheet-shaped material by a conventionally well known method, for example, by (a) sheeting an inorganic filler other than asbestos, a rubber material and a polycarbodiimide pulp or (b) kneading said three components and passing the kneaded product through a calender roll or the like.

Meanwhile, the reinforcing material used in the present invention is a material obtained by treating, for example, a woven cloth, an unwoven cloth or a paper-like material, each made of an inorganic fiber other than asbestos or an organic fiber, with a polycarbodiimide resin. The treatment is effected by, for example, impregnation, coating or spraying with the polycarbodiimide resin.

As the inorganic fiber, there can be mentioned, for example, a glass fiber, a carbon fiber, a rock wool and a ceramic fiber; as the organic fiber, there can be mentioned, for example, a polyamide fiber, a polyester fiber, a polyacrylonitrile fiber, a phenolic resin fiber and a cellulose fiber.

As the reinforcing material, there can also be used, for example, a polyester film, a polyamide film, a polycarbonate film and a polyimide film, all treated with a polycarbodiimide resin, as well as a polycarbodiimide resin film.

The selection of an appropriate reinforcing material can be made so as to best meet the use purpose, use conditions, etc. of sheet material. However, from the standpoints of heat resistance, strength, chemical resistance, etc., there are preferred a woven cloth, an unwoven cloth and a paper-like material each made of a polyamide fiber (particularly, an aromatic polyamide fiber) or a polyester fiber (particularly, an aromatic polyester fiber), for example, a cloth, a mesh, a chopped strand mat, a paper, etc. As to the film, there are preferred a polyamide film (particularly, an aromatic polyamide film), a polyester film (particularly, an aromatic polyester film), a polycarbodiimide resin film, etc. from the standpoints of heat resistance, chemical resistance, adhesion to polycarbodiimide, etc.

The polycarbodiimide resin used for treating the reinforcing material is produced by decarboxylation and condensation of isocyanate. The processes for the production are disclosed in D. J. Lyman et al., Die Makromol. Chem., 67, 1 (1963); E. Dyer et al., J. Amer. Chem. So., 80, 5495(1958); L. M. Alberino et al., J. Appl. Polym. Sci., 21, 1999(1977); T. W. Campbell, J. Org. Chem., 28, 2069 (1963);Japanese Patent Application Kokai No. 61599/1976; etc.

The polycarbodiimide resin produced according to any of these processes is a powder or liquid of low molecule. It may be used for impregnation or coating of the above-mentioned woven cloth, unwoven cloth or paper-like material, or for coating of a high-molecular film. However, the polycarbodiimide resin of powder state is difficult to handle, and that of liquid state has a short pot life. Accordingly, in the present invention, there is preferably used a polycarbodiimide resin of liquid state having a high molecular weight and good stability, or a product obtained by removing a solvent from a polycarbodiimide pulp dope.

The polycarbodiimide resin of liquid state having a high molecular weight and good stability is a polymer solution obtained, for example, by subjecting an organic diisocyanate represented by the general formula

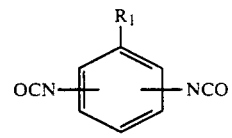

(R1 is a lower alkyl group or a lower alkoxy group) to decarboxylation and condensation using a halogenated hydrocarbon as a polymerization solvent, or by subjecting an organic diisocyanate represented by the general formula

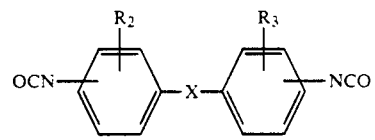

(R2 and R3 are each a lower alkyl group or an alkoxy group, and X is an oxygen atom or a methylene group) to decarboxylation and condensation using an alicyclic ether as a polymerization solvent.

The woven cloth, unwoven cloth or paper-like material made of an inorganic or organic fiber is immersed in the above polymer solution or a dope obtained during polycarbodiimide pulp production, followed by drying to effect impregnation, or is coated or sprayed with the solution or the dope, whereby reinforcing material treated with a polycarbodiimide resin can be obtained. The thus obtained reinforcing material has good adhesion to organic, inorganic or high-molecular materials and excellent heat resistance owing to the treatment with the polycarbodiimide resin. The above-mentioned film can also be made into a similar reinforcing material by coating or spraying of the above solution or the dope.

In producing the sheet material of the present invention, an inorganic filler other than asbestos, a rubber material and a polycarbodiimide pulp are, for example, sheeted or kneaded and rolled to prepare sheet-shaped material; reinforcing material treated with a polycarbodiimide resin is placed on the sheet-shaped material or interposed between the sheet-shaped materials; they are hot-pressed by a calender roll, a press or the like at a temperature equal to or higher than the softening points of the polycarbodiimide pulp and the polycarbodiimide resin. The temperature is, for example, 140° C. or more.

As described above, the sheet material of the present invention comprises a sheet-shaped material made of an inorganic filler other than asbestos, a rubber material and a polycarbodiimide pulp having thermosetting property, uniform dispersibility in water and heat resistance and a reinforcing material treated with a polycarbodiimide resin, excellent in heat resistance, adhesion and chemical resistance. Therefore, the present sheet material has excellent flexibility, good compatibility with flange, etc. and moreover is excellent in sealing property, heat resistance and chemical resistance. Further, using no asbestos, the present sheet material has no problems such as resource, adverse effects on human health, and the like and provides very high utility.

The present invention is described in more detail by way of Examples and Comparative Examples.

EXAMPLE 1

| | | |
|---|---|---|
| Polycarbodiimide pulp | 12% by weight | |
| Inorganic filler | 65% by weight | |
| mica | 18% by weight | |
| barium sulfate | 15% by weight | |
| magnesium sulfate | 15% by weight | |
| carbon black | 17% by weight | |
| Rubber material (NBR latex) | 23% by weight | (as solid content) |

The above three materials were compounded and made into two sheets.

Then, a glass cloth of 0.1 mm in thickness was immersed in a polycarbodiimide solution (polymer concentration: 5% by weight, solvent: tetrahydrofuran) and dried to obtain a reinforcing material whose surface and gaps between glass fibers were treated with a polycarbodiimide resin and whose resin concentration was 10% by weight. This reinforcing material was interposed between the two sheets prepared above, and they were hot-pressed at 180° C. to obtain a sheet of 0.4 mm in thickness.

The sheet was measured for tensile strength and sealing property. The results are shown in Table 1.

The sealing property was measured as follows.

A gasket of desired shape was punched out of the sheet, inserted between two adjacent flanges of a pipe, then tightened at 100 kgf.cm by a torque wrench. Nitrogen of 7kg/cm$^2$ was passed through the pipe, and the nitrogen portion which leaked from the flanges was captured for 10 minutes by a water-nitrogen displacement method. The captured nitrogen volume was taken as the sealing property of the sheet.

EXAMPLE 2

| | | |
|---|---|---|
| Polycarbodiimide pulp | 20% by weight | |
| Inorganic filler | 65% by weight | |
| mica | 15% by weight | |
| barium sulfate | 15% by weight | |
| talc | 10% by weight | |
| glass fiber | 5% by weight | |
| magnesium sulfate | 10% by weight | |
| carbon black | 10% by weight | |
| Rubber material (NBR latex) | 15% by weight | (as solid content) |

The above three materials were compounded and made into two sheets.

Then, a glass cloth of 0.15 mm in thickness was immersed in a polycarbodiimide solution (polymer concentration: 5% by weight, solvent: perchloroethylene) and dried to obtain a reinforcing material treated with a polycarbodiimide resin so as to give a resin concentration of 8% by weight. This reinforcing material was interposed between the two sheets prepared above, and they were hot-pressed at 200° C. to obtain a sheet of 0.55 mm in thickness.

The sheet was measured for tensile strength and sealing property. The results are shown in Table 1.

EXAMPLE 3

| | | |
|---|---|---|
| Polycarbodiimide pulp | 15% by weight | |
| Inorganic filler | 70% by weight | |
| mica | 18% by weight | |
| barium sulfate | 15% by weight | |
| magnesium sulfate | 15% by weight | |
| carbon black | 10% by weight | |
| rock wool | 3% by weight | |
| vermiculite | 3% by weight | |
| wollastonite | 6% by weight | |
| Rubber material (acrylic rubber latex) | 15% by weight | (as solid content) |

The above three materials were compounded and made into two sheets.

A glass unwoven cloth of 0.1 mm in thickness was sprayed with a polycarbodiimide solution (polymer concentration: 7% by weight, solvent: tetrahydrofuran) and dried to obtain a reinforcing material treated with a polycarbodiimide resin. This reinforcing material was interposed between the two sheets prepared above, and they were hot-pressed at 220° C. to obtain a sheet of 0.5 mm in thickness.

The sheet was measured for tensile strength and sealing property. The results are shown in Table 1.

EXAMPLE 4

| | | |
|---|---|---|
| Polycarbodiimide pulp | 14% by weight | |
| Inorganic filler | 65% by weight | |
| mica | 15% by weight | |
| barium sulfate | 15% by weight | |
| magnesium sulfate | 10% by weight | |
| carbon black | 10% by weight | |
| gypsum | 10% by weight | |
| clay | 5% by weight | |
| Rubber material (NBR latex) | 21% by weight | (as solid content) |

To the compound of the above three materials was added an appropriate amount (about 80% based on the weight of the compound) of toluene. The mixture was kneaded by a kneader and rolled to prepare two sheets.

The surface of a polyester film of 0.1 mm in thickness was brush-coated with a polycarbodiimide solution (polymer concentration: 3% by weight, solvent: perchloroethylene) and dried to obtain a reinforcing material treated with a polycarbodiimide resin. This reinforcing material was interposed between the two sheets prepared above, and they were hot-pressed at 180° C. to obtain a sheet of 0.5 mm in thickness.

The sheet was measured for tensile strength and sealing property. The results are shown in Table 1.

EXAMPLE 5

| | |
|---|---|
| Polycarbodiimide pulp | 20% by weight |
| Inorganic filler | 67% by weight |
| mica | 13% by weight |
| barium sulfate | 10% by weight |
| calcium carbonate | 7% by weight |
| carbon black | 10% by weight |
| silica | 8% by weight |
| carbon fiber | 4% by weight |
| magnesium sulfate whisker | 15% by weight |
| Rubber material (NBR latex) | 13% by weight (as solid content) |

Toluene was added to the compound of the above three materials, and the mixture was kneaded by a kneader and rolled to prepare two sheets.

A ceramic fiber paper of 0.2 mm in thickness was sprayed with a polycarbodiimide solution (polymer concentration: 7% by weight, solvent: perchloroethylene) and dried to obtain a reinforcing material treated with a polycarbodiimide resin. This reinforcing material was interposed between the two sheets prepared above, and they were hot-pressed at 200° C. to obtain a sheet of 0.7 mm in thickness.

The sheet was measured for tensile strength and sealing property. The results are shown in Table 1.

EXAMPLE 6

| | |
|---|---|
| Polycarbodiimide pulp | 17% by weight |
| Inorganic filler | 68% by weight |
| mica | 18% by weight |
| barium sulfate | 13% by weight |
| magnesium sulfate whisker | 14% by weight |
| gypsum wisker | 10% by weight |
| carbon black | 13% by weight |
| Rubber material (chloroprene rubber latex) | 15% by weight (as solid content) |

The above materials were compounded and sheeted to prepare two sheets.

A carbon cloth of 0.15 mm in thickness was immersed in a polycarbodiimide solution (polymer concentration: 5% by weight, solvent: tetrahydrofuran) and dried to obtain a reinforcing material treated with a polycarbodiimide resin, having a resin content of 8% by weight. This reinforcing material was interposed between the two sheets prepared above, and they were hot-pressed at 170° C. to obtain a sheet of 0.6 mm in thickness.

The sheet was measured for tensile strength and sealing property. The results are shown in Table 1.

EXAMPLE 7

| | |
|---|---|
| Polycarbodiimide pulp | 13% by weight |
| Inorganic filler | 65% by weight |
| mica | 18% by weight |
| barium sulfate | 15% by weight |
| magnesium sulfate whisker | 15% by weight |
| carbon black | 17% by weight |
| Rubber material (mixed latex of NBR and acrylic rubber) | 22% by weight (as solid content) |

The above materials were compounded and sheeted to prepare two sheets.

A glass paper of 0.08 mm in thickness was sprayed with a polycarbodiimide solution (polymer concentration: 10% by weight, solvent: perchloroethylene) and dried to obtain a reinforcing material treated with a polycarbodiimide resin. This reinforcing material was interposed between the two sheets prepared above, and they were hot-pressed at 210° C. to obtain a sheet of 0.4 mm in thickness.

The sheet was measured for tensile strength and sealing property. The results are shown in Table 1.

EXAMPLE 8

| | |
|---|---|
| Polycarbodiimide pulp | 15% by weight |
| Inorganic filler | 62% by weight |
| mica | 13% by weight |
| barium sulfate | 7% by weight |
| magnesium sulfate whisker | 10% by weight |
| carbon black | 10% by weight |
| gypsum wisker | 10% by weight |
| talc | 6% by weight |
| clay | 6% by weight |
| Rubber material (NBR latex) | 23% by weight (as solid content) |

The above materials were compounded and sheeted to prepare two sheets.

A polycarbodiimide film was obtained from a polycarbodiimide solution (polymer concentration: 25% by weight, solvent: perchloroethylene) according to a casting method. This reinforcing material was interposed between the two sheets prepared above, and they were hot-pressed at 220° C. to obtain a sheet.

The sheet was measured for tensile strength and sealing property. The results are shown in Table 1.

COMPARATIVE EXAMPLE 1

A non-asbestos type joint sheet on the market was measured for tensile strength and sealing property. The results are shown in Table 1.

COMPARATIVE EXAMPLE 2

| | |
|---|---|
| Aramid pulp | 20% by weight |
| Inorganic filler | 65% by weight |
| mica | 18% by weight |
| barium sulfate | 15% by weight |
| magnesium sulfate | 15% by weight |
| carbon black | 17% by weight |
| Rubber material (NBR latex) | 15% by weight (as solid content) |

The above materials were compounded and sheeted to prepare two sheets.

A glass cloth of 0.2 mm in thickness as reinforcing material was interposed between the two sheets prepared above, and they were hot-pressed at 180° C. to obtain a sheet. The sheet was measured for tensile strength and sealing property. The results are shown in Table 1.

TABLE 1

| | Tensile strength (kg/mm$^2$) | Sealing property |
|---|---|---|
| Example 1 | 8.3 (fiber direction) | 312 |
| | 3.2 (45° direction) | |
| Example 2 | 10.0 (fiber direction) | 353 |
| | 3.8 (45° direction) | |
| Example 3 | 2.4 | 395 |
| Example 4 | 4.2 | 101 |
| Example 5 | 2.1 | 215 |

TABLE 1-continued

| | Tensile strength (kg/mm²) | Sealing property |
|---|---|---|
| Example 6 | 10.3 (fiber direction) | 311 |
| | 4.0 (45° direction) | |
| Example 7 | 2.3 | 380 |
| Example 8 | 3.5 | 203 |
| Comparative Example 1 | 1.8 | 700 |
| Comparative Example 2 | 6.2 (fiber direction) | 1,800 |
| | 1.8 (45° direction) (peeled at interface) | |

What is claimed is:

1. A sheet material comprising a layer of a sheet-shaped material made of an inorganic filler other than asbestos, a rubber material and a polycarbodiimide pulp, and a layer of a reinforcing material treated with a polycarbodiimide resin.

2. A sheet material comprising (a) a layer of a sheet-shaped material made of an inorganic filler other than asbestos, a rubber material and a polycarbodiimide pulp, and (b) a layer of a reinforcing material treated with a polycarbodiimide resin, wherein material (a) and material (b) are laminated.

3. A sheet material comprising (a) two layers of a sheet-shaped material made of an inorganic filler other than asbestos, a rubber material and a polycarbodiimide pulp, and (b) one layer of a reinforcing material treated with a polycarbodiimide resin, wherein the layer (b) is interposed between the layers (a).

4. A sheet material according to anyone of claims 1, 2 or 3, wherein the sheet-shaped material comprises 30-90% by weight of an inorganic filler other than asbestos, 5-50% by weight of a rubber material and 1-50% by weight of a polycarbodiimide pulp.

5. A sheet material according to anyone of claims 1, 2 or 3, wherein the reinforcing material is obtained by treating a woven cloth, an unwoven cloth or a paper-like material, each made of an inorganic fiber other than asbestos or an organic fiber, with a polycarbodiimide resin.

6. A sheet material according to anyone of claims 1, 2, or 3, wherein the reinforcing material is obtained by treating a polyester film, a polyamide film, a polycarbonate film or a polyimide film with a polycarbodiimide resin.

7. A sheet material according to anyone of claims 1, 2, or 3, wherein the reinforcing material is a polycarbodiimide resin film.

8. A sheet material according to any of anyone of claims 1, 2, 3, wherein the polycarbodiimide resin is obtained by subjecting an aromatic diisocyanate represented by the general formula

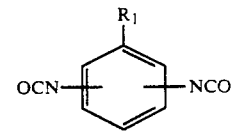

(R1 is a lower alkyl group or a lower alkoxy group) to decarboxylation and condensation using a halogenated hydrocarbon as a polymerization solvent.

9. A sheet material according to any of anyone claims 1, 2, or 3, wherein the polycarbodiimide resin is obtained by subjecting an aromatic diisocyanate represented by the general formula

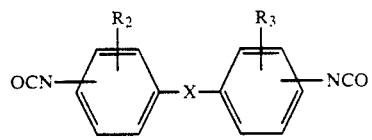

(R2 and R3 are each a lower alkyl group or an alkoxy group, and X is an oxygen atom or a methylene group) to decarboxylation and condensation using an alicyclic ether as a polymerization solvent.

* * * * *